United States Patent [19]
Liao

[11] Patent Number: 5,899,184
[45] Date of Patent: May 4, 1999

[54] AIR INLET ASSISTOR FOR A VEHICLE ENGINE

[76] Inventor: Chun-Yao Liao, 159 Lane 247, Ta Chiao 1st St., Yung Kang, Tainan Hsien, Taiwan

[21] Appl. No.: 08/990,224

[22] Filed: Dec. 15, 1997

[51] Int. Cl.[6] ........................................ F02M 3/00
[52] U.S. Cl. ............................ 123/184.21; 123/198 E
[58] Field of Search ................ 123/184.21, 184.53, 123/198 E, 198 R; 251/65; 137/540, 543.17, 543.19, 524, 549

[56] References Cited

U.S. PATENT DOCUMENTS

| | | | |
|---|---|---|---|
| 2,463,516 | 3/1949 | Burkhardt | 137/524 |
| 2,908,288 | 10/1959 | Carr et al. | 137/524 |
| 4,412,517 | 11/1983 | Kobashi et al. | 123/588 |
| 5,626,112 | 5/1997 | Liao | 123/184.21 |

*Primary Examiner*—Marguerite McMahon
*Attorney, Agent, or Firm*—Peterson, Wicks, Nemer & Kamrath, PA

[57] ABSTRACT

An air-inlet assistor has a hollow base seat, a hollow main body disposed on the hollow base seat, a hollow upper cover disposed on the hollow main body, an adjustment device disposed on the hollow upper cover, an operation device disposed in the hollow upper cover, a connection connected to the hollow upper cover, an inlet pipe connected to the connection, and an air cleaner disposed in the hollow base seat.

2 Claims, 4 Drawing Sheets

AIR INLET ASSISTOR FOR A VEHICLE ENGINE

BACKGROUND OF THE INVENTION

The present invention relates to an air-inlet assistor for a vehicle engine. More particularly, the present invention relates to an air-inlet assistor which has an upper magnet and a lower magnet to be adjusted U.S. Pat. No. 5,626,112 has disclosed an air inlet assistor for a vehicle engine This patent was invented by the same inventor of the present invention. However, the distance between the upper magnet and the lower magnet of U.S. Pat. No. 5,626,112 cannot be adjusted by the user.

SUMMARY OF THE INVENTION

An object of the present invention is to provide an air-inlet assistor which has an upper magnet and a lower magnet with the distance between the upper magnet and the lower magnet to be adjusted by the user.

Accordingly, an air-inlet assistor comprises a hollow base seat, a hollow main body disposed on the hollow base seat, a hollow upper cover disposed on the hollow main body, an adjustment device disposed on the hollow upper cover, an operation device disposed in the hollow upper cover, a connection connected to the hollow upper cover, an inlet pipe connected to the connection, and an air cleaner disposed in the hollow base seat. The hollow upper cover has an upper working chamber receiving the operation device, a threaded hole formed on a top portion of the hollow upper cover, a bottom of the hollow upper cover coupling with a top portion of the hollow main body, and a plurality of L-shaped plates disposed in a top portion and an inner periphery of the upper working chamber. The hollow main body has a center through hole. A bottom of the hollow main body couples with a top portion of the hollow base seat. The hollow base seat has a lower inlet chamber, and an inlet vent communicating with the lower inlet chamber. The lower inlet chamber receives the air cleaner. The adjustment device has an adjustment bolt inserted through the threaded hole and a nut. The nut is disposed on a top portion of the hollow upper cover. The operation device has an upper magnet disposed on a lower end of the adjustment bolt, a protruded block disposed on a bottom of the upper magnet, and a lower magnet disposed in a lower portion of the upper working chamber. An annular cushion is disposed between the lower magnet and the hollow main body. The lower magnet has a round groove. An elastic element has an upper end surrounding the protruded block and a lower end inserted in the round groove.

DETAILED DESCRIPTION OF THE INVENTION

Figure 1:
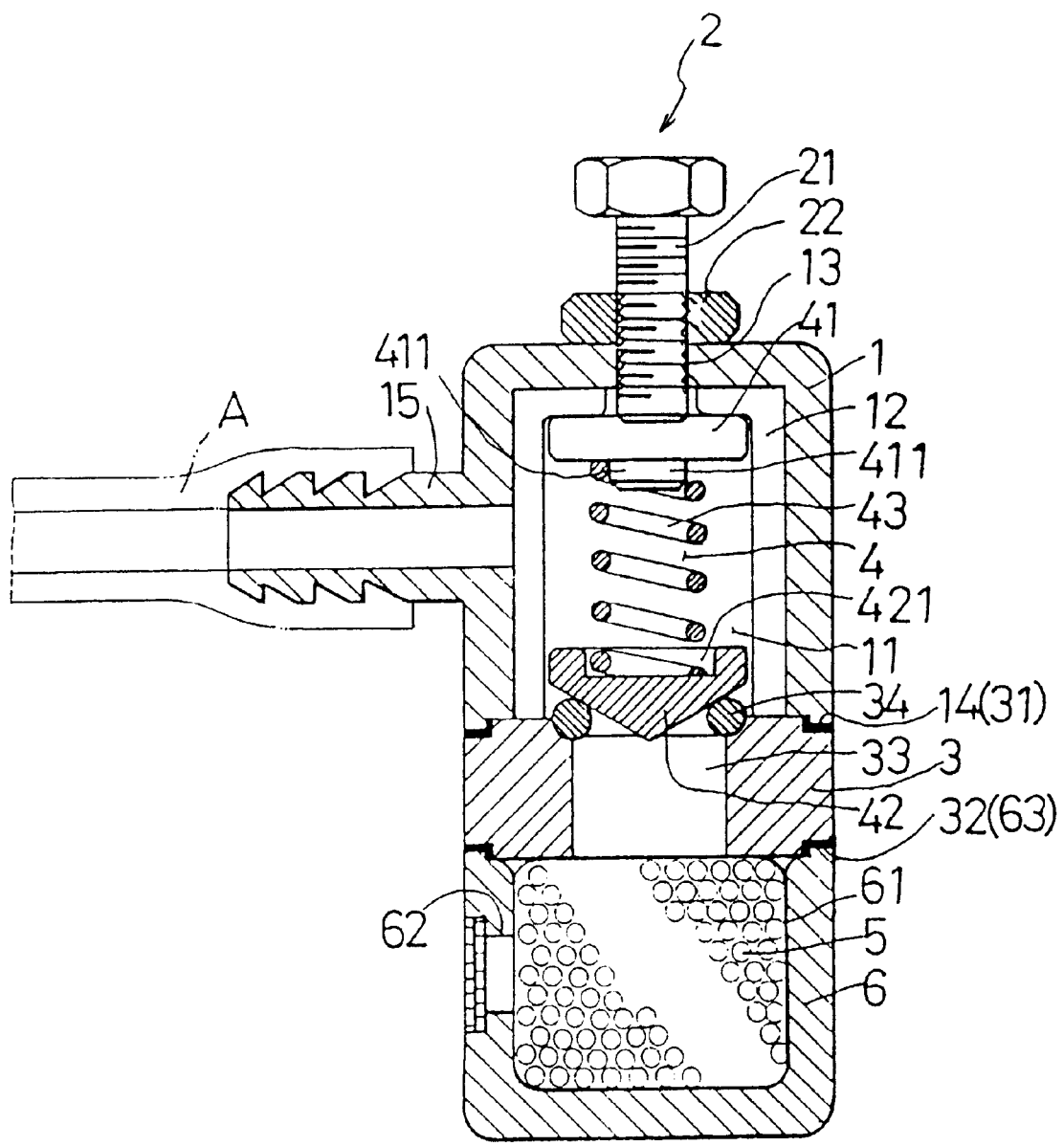
FIG. 1 is a sectional assembly view of an air-inlet assistor of a preferred embodiment in accordance with the present invention.

Referring to FIG. 1, an air-inlet assistor comprises a hollow base seat 6, a hollow main body 3 disposed on the hollow base seat 6, a hollow upper cover 1 disposed on the hollow main body 3, an adjustment device 2 disposed an the hollow upper cover 1, an operation device 4 disposed in the hollow upper cover 1, a connection 15 connected to the hollow upper cover 1, an inlet pipe A connected to the connection 15, and an air cleaner 5 disposed in the hollow base seat 6.

The hollow upper cover 1 has an upper working chamber 11 receiving the operation device 4, a threaded hole 13 formed on a top portion of the hollow upper cover 1, a bottom 14 of the hollow upper cover 1 coupling with a top portion 31 of the hollow main body 3, and a plurality of L-shaped plates 12 disposed in a top portion and an inner periphery of the upper working chamber 11.

The hollow main body 3 has a center through hole 33. A bottom 32 of the hollow main body 3 couples with a top portion 63 of the hollow base seat 6.

The hollow base seat 6 has a lower inlet chamber 61, and an inlet vent 62 communicating with the lower inlet chamber 61. The lower inlet chamber 61 receives the air cleaner 5.

The adjustment device 2 has an adjustment bolt 21 inserted through the threaded hole 13 and a nut 22. The nut 22 is disposed on a top portion of the hollow upper cover 1.

The operation device 4 has an upper magnet 41 disposed on a lower end of the adjustment bolt 21, a protruded block 411 disposed on a bottom of the upper magnet 41, and a lower magnet 42 disposed in a lower portion of the upper working chamber 11. An annular cushion 34 is disposed between the lower magnet 42 and the hollow main body 3. The lower magnet 42 has a round groove 421. An elastic element 43 (such as a spring) has an upper end surrounding the protruded block 411 and a lower end inserted in the round groove 421.

Figure 2:
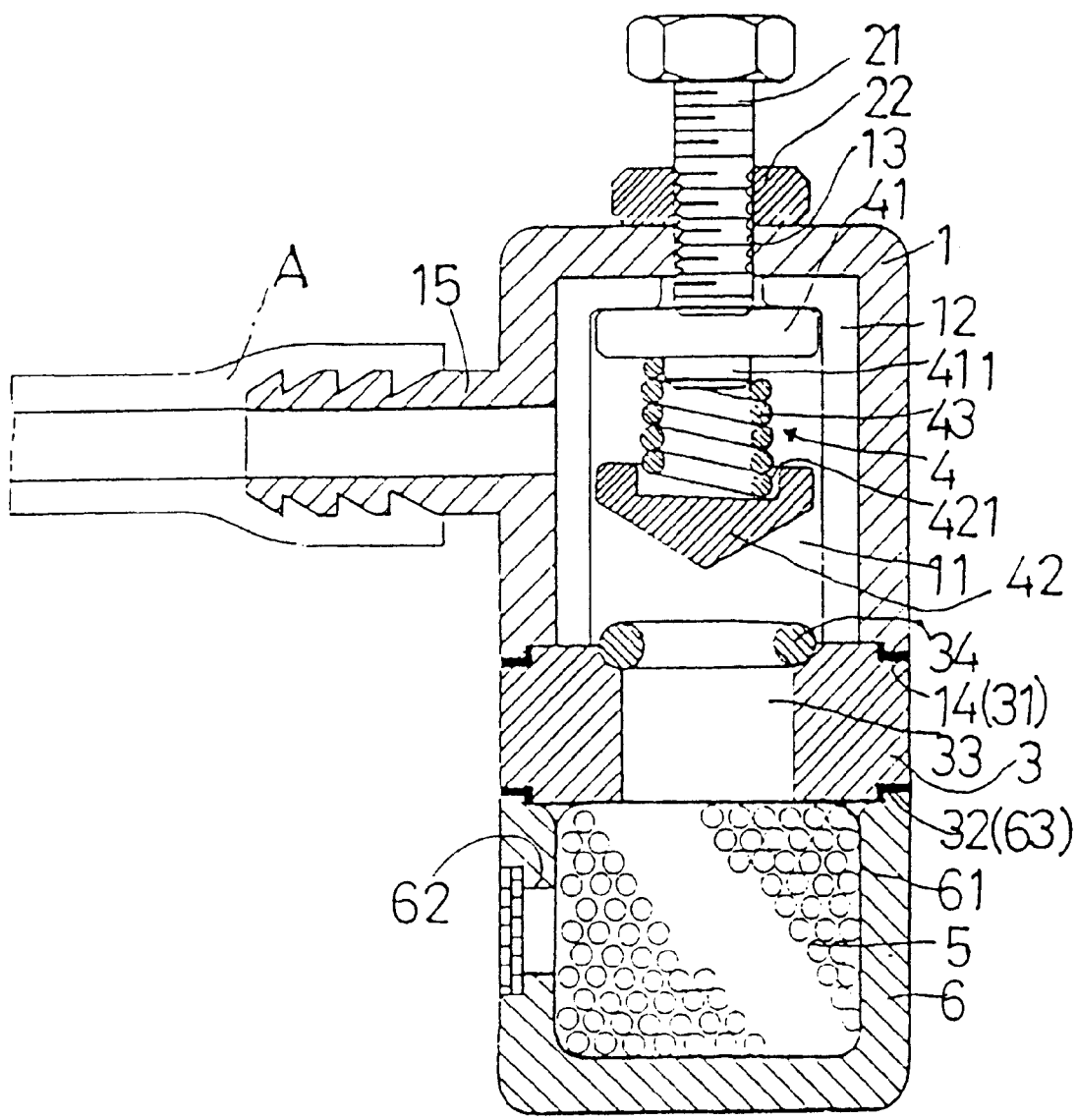
FIG. 2 is a sectional assembly view of an air-inlet assistor while the air-inlet assistor is operated.

Referring to FIG. 2, the lower magnet 42 moves upward toward the upper magnet 41. The elastic element 43 is compressed.

Figure 3:
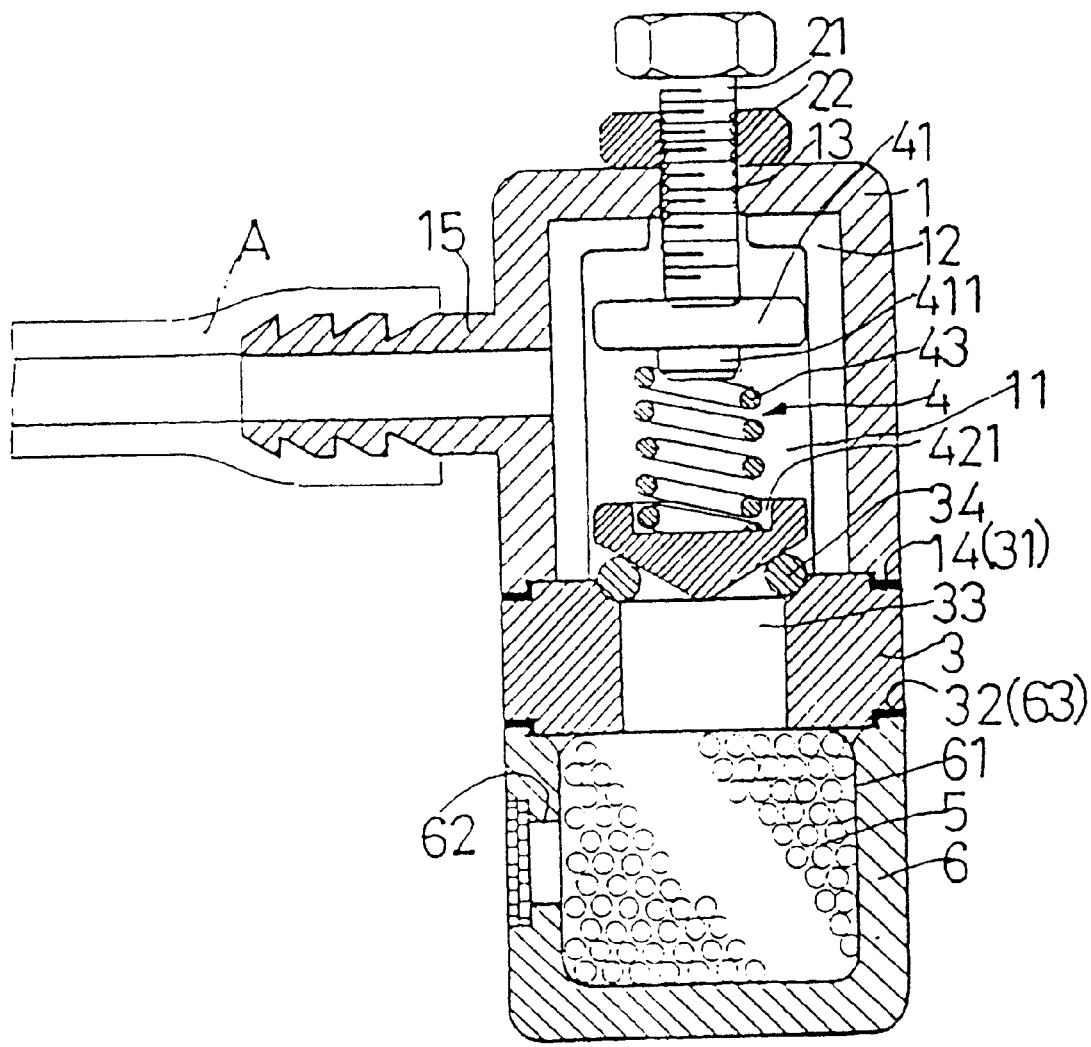
FIG. 3 is a sectional assembly view of an air-inlet assistor while the adjustment device is adjusted.
Figure 4:
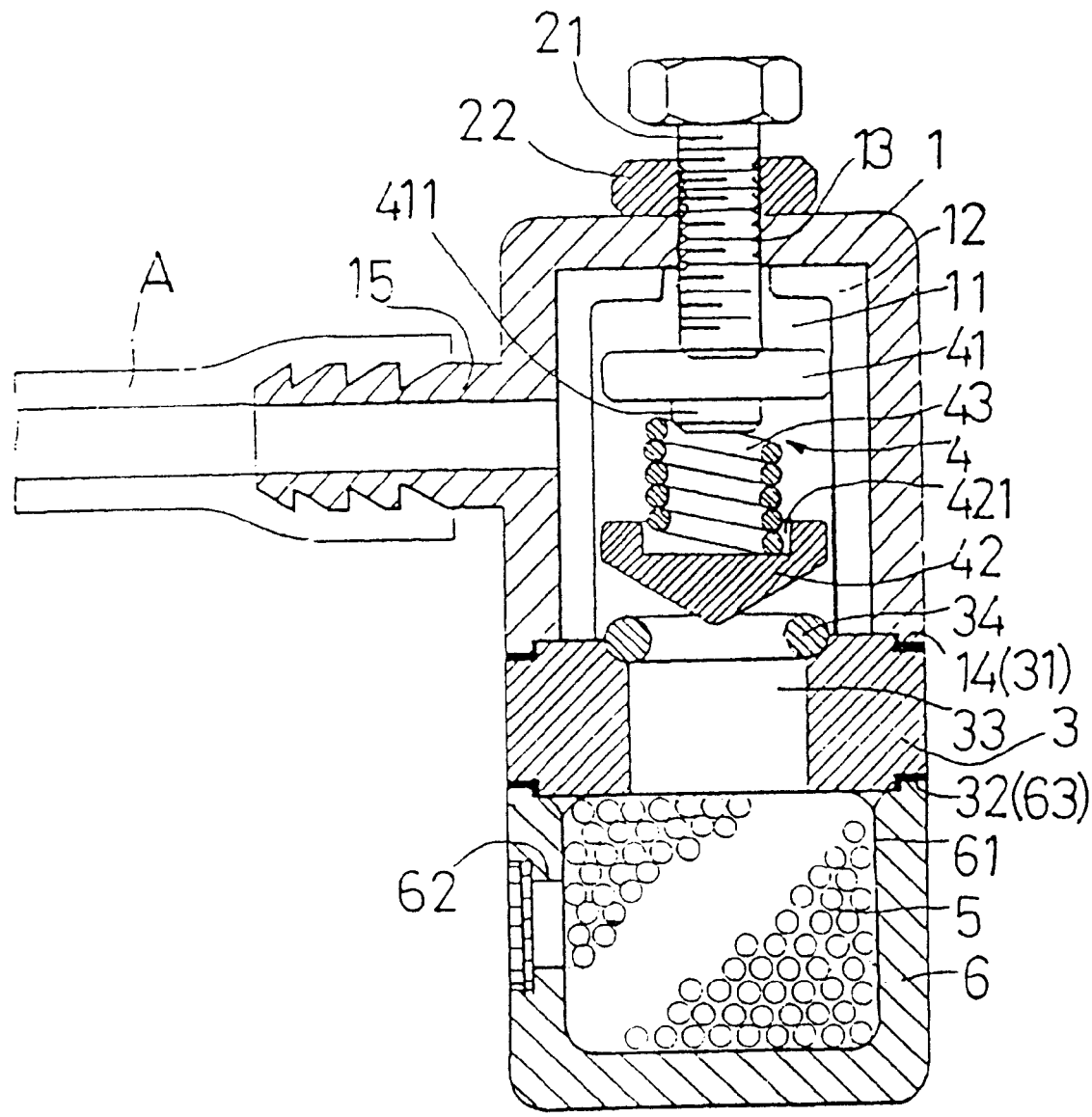
FIG. 4 is a sectional assembly view of an air-inlet assistor while the adjustment device is adjusted and the air-inlet assistor is operated.

Referring to FIG. 3, the adjustment bolt 21 is adjusted for various types of engines (not shown in the figures). Referring to FIG. 4, the lower magnet 42 moves upward toward the upper magnet 41. The elastic element 43 is compressed.

The invention is not limited to the above embodiment but various modification thereof may be made. Further, various changes in form and detail may be made without departing from the scope of the invention.

I claim:

1. An air-inlet assistor comprises:

a hollow base seat, a hollow main body disposed on the hollow base seat, a hollow upper cover disposed on the hollow main body, an adjustment device disposed on the hollow upper cover, an operation device disposed in the hollow upper cover, a connection connected to the hollow upper cover, an inlet pipe connected to the connection, and an air cleaner disposed in the hollow, base seat, the hollow upper cover having an upper working chamber receiving the operation device, a threaded hole formed on a top portion of the hollow upper cover, a bottom of the hollow upper cover coupling with a top portion of the hollow main body, and a plurality of L-shaped plates disposed in a top portion and an inner periphery of the upper working chamber, the hollow main body having a center through hole, a bottom of the hollow main body coupling with a top portion of the hollow base seat, the hollow base seat having a lower inlet chamber, and an inlet vent communicating with the lower inlet chamber, the lower inlet chamber receiving the air cleaner, the adjustment device having an adjustment bolt inserted through the threaded hole and a nut, the nut disposed on a top portion of the hollow upper cover, the operation device having an upper magnet disposed on a lower end of the adjustment bolt, a protruded block disposed on a bottom of the upper magnet, and a lower magnet disposed in a lower portion of the upper working chamber, an annular cushion disposed between the lower magnet and the hollow main body, the lower magnet having a round groove, and an elastic element having an upper end surrounding the protruded block and a lower end inserted in the round groove.

2. An air inlet assistor as claimed in claim 1, wherein the elastic element is a spring.

* * * * *